United States Patent
Walton

[15] 3,677,297
[45] July 18, 1972

[54] BUTTERFLY VALVES
[72] Inventor: Peter Walton, Gloucester, England
[73] Assignee: Serck Industries Limited, Birmingham, England
[22] Filed: June 22, 1970
[21] Appl. No.: 48,303

[30] Foreign Application Priority Data
  Sept. 22, 1969 Great Britain..................46,486/69

[52] U.S. Cl..........................................137/625.28, 251/305
[51] Int. Cl.............................................................F16k 1/22
[58] Field of Search..................251/283, 305, 306, 121; 137/625.28, 625.30

[56] References Cited
UNITED STATES PATENTS
965,322  7/1910  Peterson........................251/305 X Primary Examiner—Henry T. Klinksiek
Attorney—Holman & Stern

[57] ABSTRACT

A butterfly valve has a vane in the form of a disc with part-spherical periphery. The periphery engages the valve housing to shut the valve. Portions of the vane are removed so that as the valve is opened the whole of the fluid flow passes over the relieved portion. By selection of the shape of the relieved portions a desired flow characteristic may be obtained.

4 Claims, 12 Drawing Figures

BUTTERFLY VALVES

This invention relates to butterfly valves and has as an object to provide a butterfly valve having an improved flow characteristic.

A butterfly valve in accordance with the invention incorporates a valve body, a through passage in the body, a vane within the passage and means pivotally supporting the vane in the body, the vane having a generally disc-shaped configuration, a part of the periphery of the disc forming part of the surface of a sphere and material being removed from the remainder of the periphery and from a face of the disc so that, over at least part of the angular rotation of the vane substantially the whole of a fluid controlled in use, by the valve flows through an opening defined by the material removed from the disc.

Figure 1:
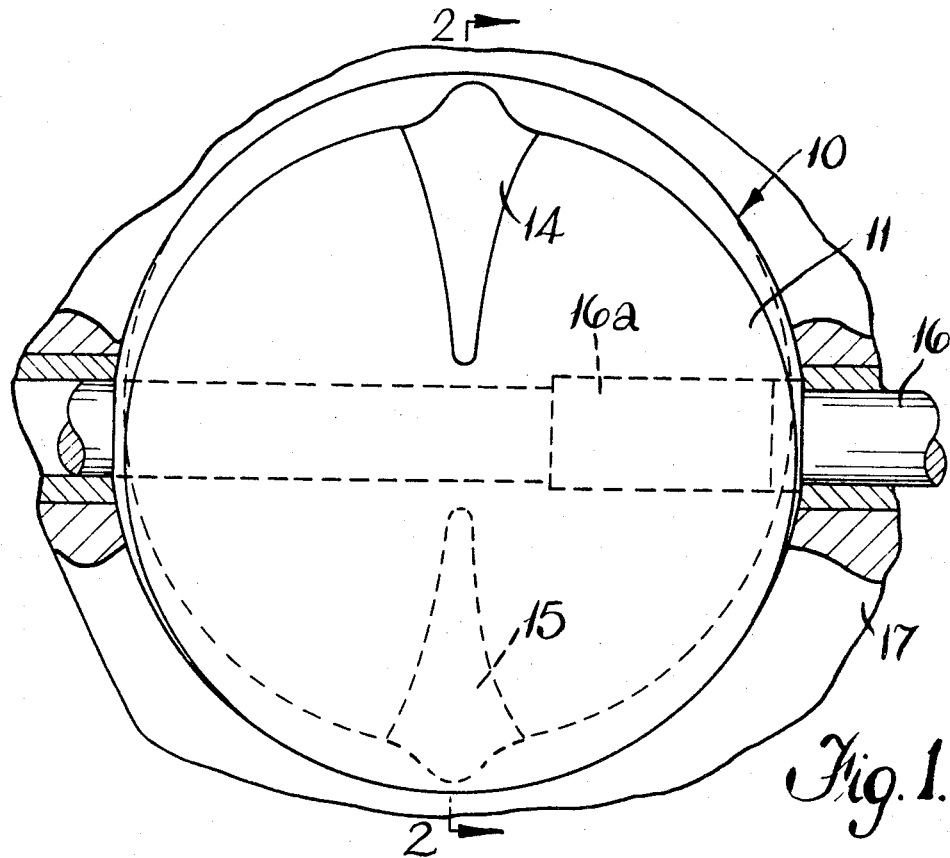
Figure 3:
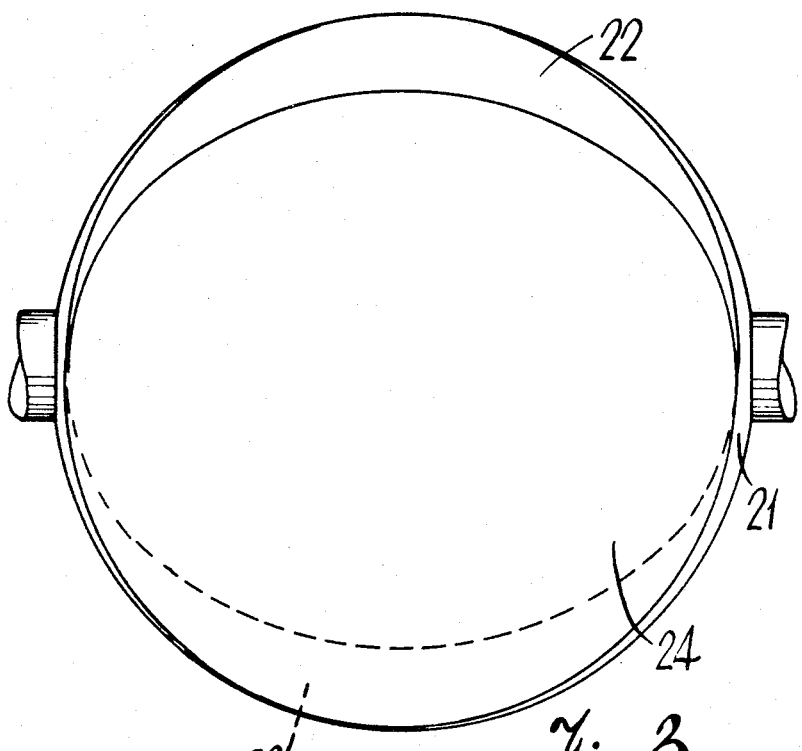
Figure 2:
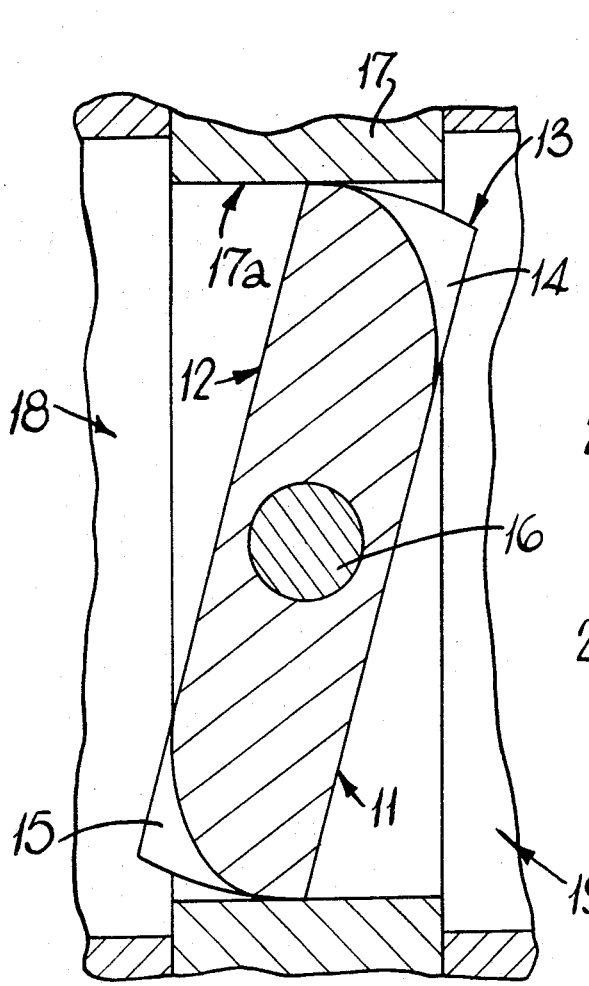
Figure 4:
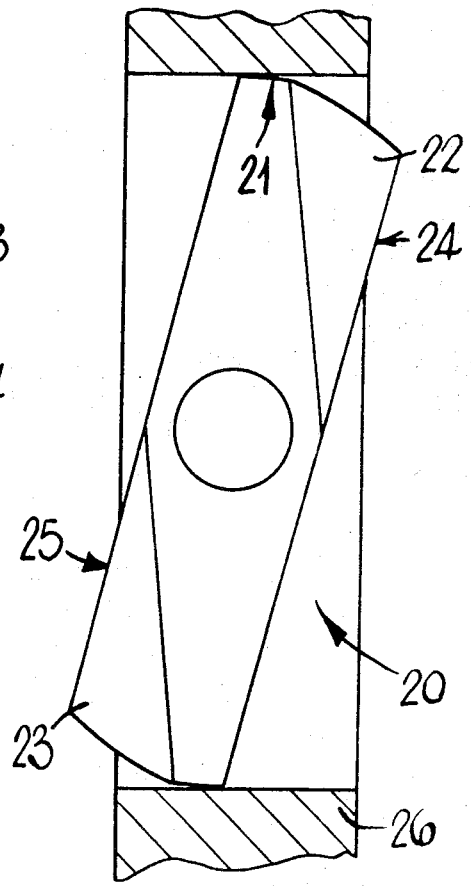
Figure 5:
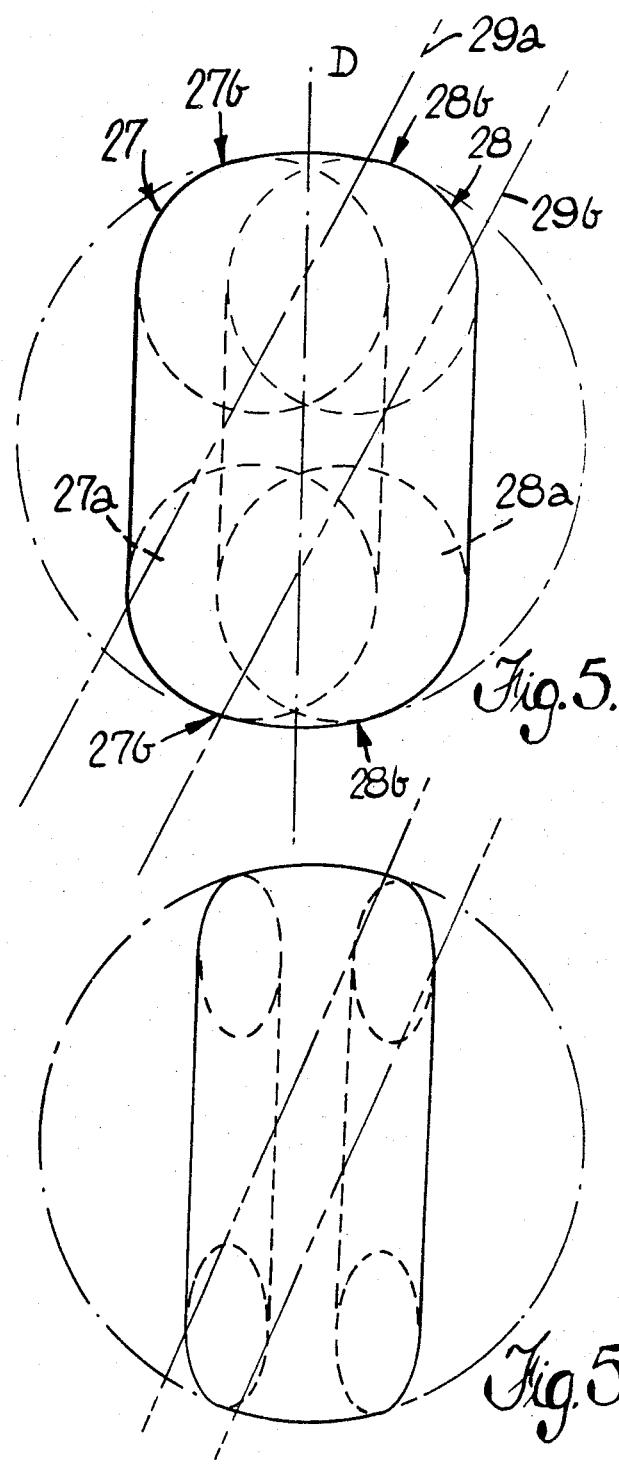
Figures 6, 7:
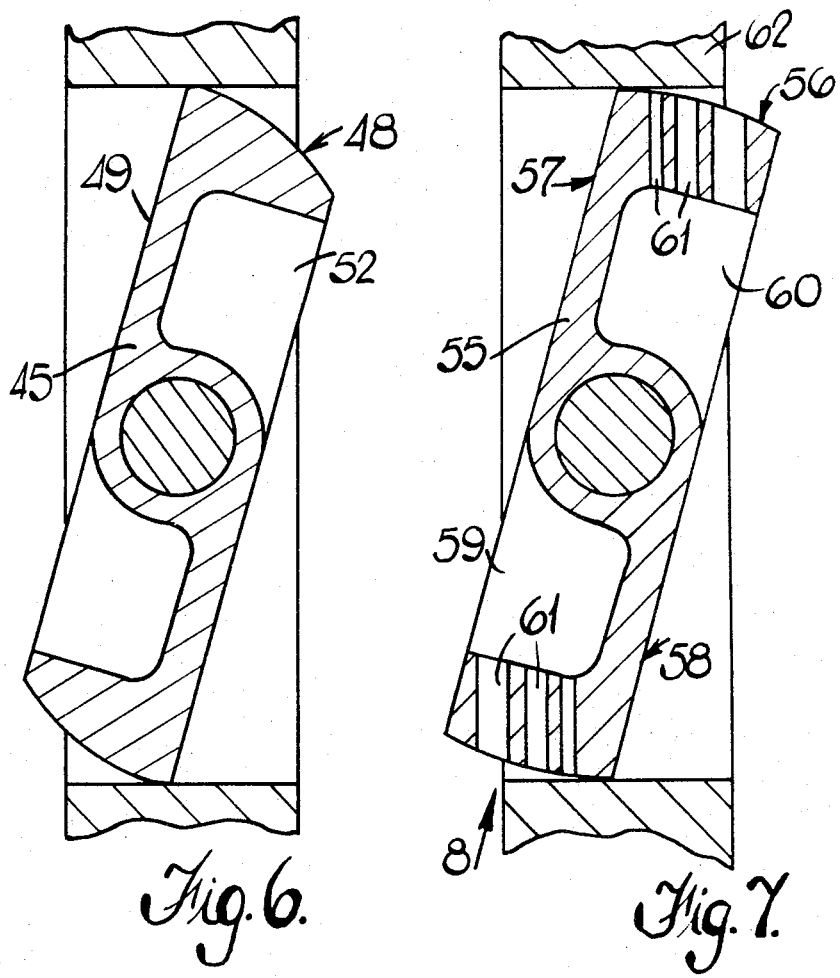
Figure 8:
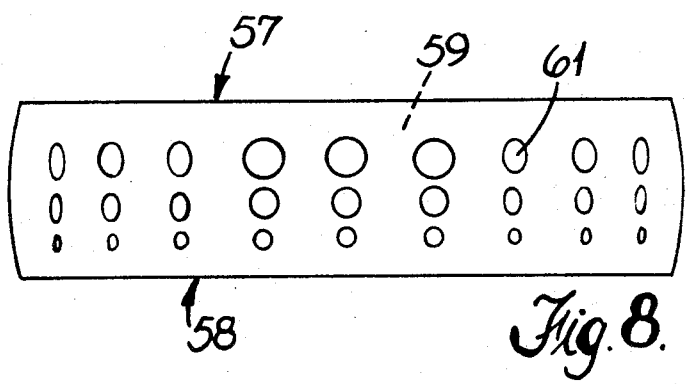
Figure 9:
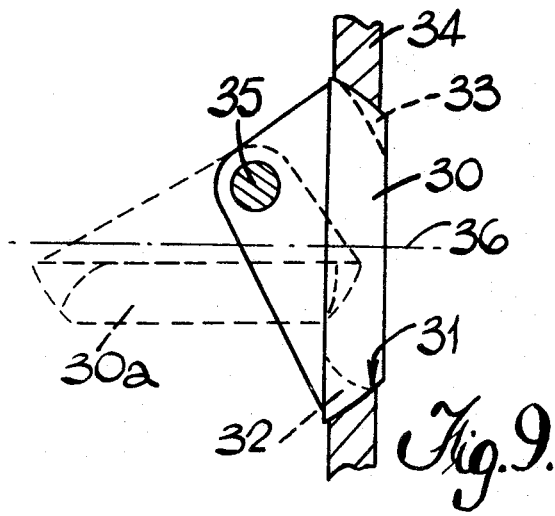
Figure 10:
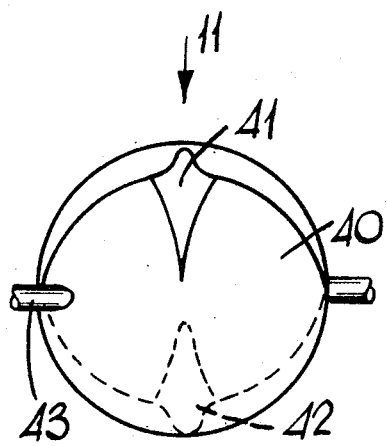
Figure 11:
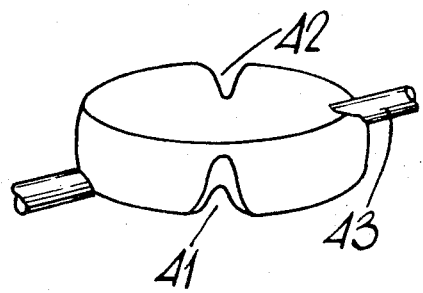

Embodiments of the invention will now be described by way of example and with reference to the accompanying drawings in which:

FIG. 1 is a part section through a butterfly valve,
FIG. 2 is a section on line 2—2 in FIG. 1,
FIGS. 3 and 4 are two views of a vane for a butterfly valve,
FIGS. 5 and 5a show a method of forming a vane,
FIGS. 6 and 7 show alternative forms of vane,
FIG. 8 is a view on arrow 8 in FIG. 7,
FIGS. 9 and 10 show, to a different scale, alternative methods of mounting a vane in a valve and
FIG. 11 is a view on arrow 11 in FIG. 10.

The valve shown in FIGS. 1 and 2 includes a vane 10 having as a basic form a sphere from which two segments have been removed to create a disc shape having a pair of flat faces 11, 12 and a part-spherical periphery 13. Two notches 14, 15 are formed in the faces 11, 12 at diametrically opposite portions thereof, and open on to the periphery 13. The two notches 14, 15 do not extend right through the thickness of the vane 10. The vane 10 is mounted on a pivot 16 having a splined portion 16a whose axis passes through the center of the basic sphere. The pivot 16 is journalled within a valve body 17 having a through passage with an upstream side 18 and a downstream side 19.

The valve shown in the example does not include sealing means around the pivot 16 or on a face 17a of the valve body 17. When the vane 10 is in its closed position the periphery 13 of the vane 10 lies closely adjacent to the face 17a so as effectively to shut off flow through the valve. The absence of sealing means as described has the effect that the valve does not become tight shut. In use, movement of the vane 10 in an anti-clockwise direction, as seen in FIG. 2, exposes increasing amounts of the notches 14, 15 to the upstream and downstream sides 18, 19 respectively of the through passage. Thus, until some part of the part spherical periphery 13 is clear of the body face 17a the whole of the fluid flow is via the notches 14, 15. A desired flow characteristic for the valve may thus be obtained by forming the notches 14, 15 to required dimensions. It will be understood that the vane 10 may be formed with a single notch, or a combination of notches, to provide a required flow characteristic.

An alternative form of vane 20 for a butterfly valve is shown in FIGS. 3 and 4 and is generally similar to that described above. The part-spherical periphery 21 is formed with part-spherical relieved portions 22, 23 which respectively include the flat faces 24, 25 but which do not extend through the whole thickness of the vane 20. The vane 20 is mounted in a valve body shown generally at 26 and the operation of the valve is substantially the same as that previously described with reference to FIGS. 1 and 2, the fluid flow initially being via the relieved portions 22, 23.

A method by which the portions 22, 23 of the vane 20 may be formed may be understood by reference to FIG. 5.

A basic sphere is formed with a pair of surfaces 27, 28 which respectively form parts of the surfaces of a pair of imaginary toroids 27a, 28a which are in spaced parallel relationship at equal distances on either side of a diameter D of the sphere. The toroids 27a, 28a have circular cross sections and are tangential to the sphere around the whole segmental circumference thereof at 27b and 28b respectively. Metal is removed from the resultant shape to leave a slice, defined between the lines 29a, 29b which forms the required vane.

It will be understood that the relieved portions of the vane may be formed from toroids of non-circular cross-section, as shown at 5a, to provide a desired flow characteristic for a valve. The resultant relieved portion may thus be in the form of any conic section, an involute or, in fact, of any shape which defines a smooth curve tangential to the spherical portion of the vane.

The vane 43 shown in section in FIG. 6 is generally similar to the vane 20, having a part-spherical peripheral surface 46 and a pair of part-spherical relieved portions 47, 48. The faces 49, 50 of the vane 45 are, however, respectively formed with recesses 51, 52. These recesses act, in use, in a manner similar to a Pelton Wheel to provide a torque tending to move the vane 45 in an anti-clockwise direction to an open position in its associated valve irrespective of the direction of fluid flow. This opening torque opposes the closing torque to which the vanes of butterfly valves are normally subjected in use.

The vane 55 shown in FIGS. 7 and 8 has a part-spherical periphery 56 and a pair of faces 57, 58 respectively formed with recesses 59, 60. Holes 61 extend from the periphery 56 to the recesses 59, 60. The holes 61 are preferably arranged in rows and may be graduated in size as shown. The vane 55 is mounted in its associated valve so that when the valve is shut the holes 61 are closed by the valve seat 62. The vane 55 is rotated anti-clockwise as shown in FIG. 7, to open the valve, the recesses 59, 60 providing an opening torque as above described. As the valve is opened fluid flows initially through the holes 61 as these move clear of the valve seat 62. The number and sizes of the holes 61 are arranged to provide a desired characteristic for the valve.

A vane 30, shown in FIG. 9, has a part-spherical periphery 31 formed with a pair of notches 32, 33 as described above. Vane 30 is mounted in a valve body 34 by means of a pivot 35 which is offset both from the center of the surface 31 and from the axis 36 of a through passage in the valve body 34. In its open position the vane 30 moves to the position shown at 30a. This arrangement has the effect that a pressure applied to the side of the vane 30 on which the pivot 35 lies urges the vane 30 against the mating part of the body 34, resulting in an improved sealing characteristic.

A vane 40, shown in FIGS. 10 and 11 is substantially the same as the vane 10 shown in FIGS. 1 and 2, and includes a pair of notches 41, 42. Vane 40 is, however, mounted on a pivot 43 whose axis extends through the generating center of the spherical surface of the vane 40 and is inclined to the plane of the vane 40. Pivot 43 is mounted in a valve body (not shown) so that, in use, the axis of rotation of the vane 40 is not perpendicular to the axis of the passage through the valve body.

Having thus described my invention what I claim as new and desire to secure by Letters Patent is:

1. A butterfly valve incorporating a valve body, a through passage in the body, a vane within the passage and means pivotally supporting the vane in the body, the vane having a generally disc-shaped configuration, a part of the periphery of the disc forming part of the surface of a sphere and a portion of the periphery and of an adjacent face of the disc being relieved, the said relieved portion forming part of the surface of a toroid, so that, over at least part of the angular rotation of the vane substantially the whole of a fluid controlled, in use, by the valve flows through an opening defined by the relieved portion of the disk.

2. A valve as claimed in claim 1 in which the toroid has a non-circular cross section.

3. A valve as claimed in claim 2 in which the relieved portion is tangential to the spherical portion of the vane.

4. A valve as claimed in claim 1 in which there are a pair of relieved portions at diametrically opposed positions on the disc.

* * * * *